United States Patent
Planeta et al.

[11] Patent Number: 6,162,318
[45] Date of Patent: Dec. 19, 2000

[54] PRODUCTION OF STRETCH PLASTIC FILM

[75] Inventors: Mirek Planeta; Harinder Tamber, both of Mississauga; Herbert Lam, Richmond Hill, all of Canada

[73] Assignee: Macro Engineering & Technology Inc., Oakville, Canada

[21] Appl. No.: 09/080,353

[22] Filed: May 18, 1998

[51] Int. Cl.[7] .................................................. B29C 47/20
[52] U.S. Cl. ..................... lp;1p156/244.27; 156/308.2; 156/309.6; 264/209.3
[58] Field of Search ............................ 264/290.2, 173.12, 264/173.14, 173.19, 209.3, 209.1, 209.5, 563, 564, 565, 569; 428/500, 515, 516; 525/240; 526/348.1; 156/308.2, 244.27, 309.6

[56] References Cited

U.S. PATENT DOCUMENTS

| | | | |
|---|---|---|---|
| 4,189,288 | 2/1980 | Halter | 425/72 |
| 4,277,594 | 7/1981 | Matthews et al. | 526/352 |
| 4,863,770 | 9/1989 | Knox, III et al. | 428/35.7 |
| 5,407,732 | 4/1995 | Dokurno | 428/213 |
| 5,458,841 | 10/1995 | Shirrell | 264/230 |

*Primary Examiner*—Paul Thibodeau
*Assistant Examiner*—D Lawrence Tarazano
*Attorney, Agent, or Firm*—Robert F. Delbridge

[57] ABSTRACT

Stretch plastic film is formed by extruding suitable plastic material from an annular die as a tubular film, forming extruded film into a bubble with air entrapped therein by collapsing the tubular film at a predetermined distance from the annular die, and causing the temperature of the tubular film when collapsed to be sufficiently high to cause opposite sides of the collapsed film to become bonded together to form a single layer of film.

12 Claims, 1 Drawing Sheet

PRODUCTION OF STRETCH PLASTIC FILM

This invention relates to the production of stretch plastic film.

BACKGROUND OF THE INVENTION

Stretch plastic film, commonly known as stretch wrap, has gained substantial acceptance for such uses as warehouse packaging applications where plastic film is stretched around pallets, containers or irregular loads and allowing the built-in elastic recovery properties of the film to constrain the surrounded item(s). A number of plastic materials, such as PVC, LLDPE, LDPE and PE copolymerized with other suitable compounds such as vinyl acetate, acrylic acid or methacrylic acid, are used to produce stretch film for commercial use, with the usual thickness of such film being from about 18 to 30 microns.

The properties of the stretch film obtained are dependent upon a large number of variables, such as the extrusion process, film thickness, monolayer or co-extruded multi-layer film, cooling rate, blow up ratio and stretch ratio. Currently, extensive research work is being carried out in industrial laboratories to improve the properties of stretch film, such as balance of peel/lap cling, tensile strength, tear resistance, transparency, etc.

Most stretch films are produced by a cast film process. However, a cast film process has inherent disadvantages in the production of stretch film. In the cast film process, orientation is effective only in the machine direction with consequent weakness in tensile strength. Also, due to inherent nature of the cast film process, edge trimming is essential. This usually results in kinks in the edges, thereby rendering the film vulnerable to tear. Tensile strength and tear properties can be improved by using a blown film process rather than a cast film process.

It is therefore an object of the invention to provide a suitable method for producing a stretch film by means of a blown film process.

SUMMARY OF THE INVENTION

According to the invention, a stretch plastic film comprises a collapsed tubular film of suitable plastic material with opposite sides of the collapsed film being bonded together.

Stretch film produced in accordance with the invention does not have edge kinks and also has improved tear resistance compared to cast stretch film. Also, it has been found that tensile strength and elasticity may be improved by up to about 30% in stretch film produced in accordance with the invention compared to film produced by a blown film process where the tubular film is twice the thickness of the tubular film produced in accordance with the present invention and is slit to provide a single layer film. This is probably due to the higher orientation of the film produced in accordance with the present invention because of a higher draw down ratio and higher surface tension for thinner gauge films.

Stretch film in accordance with the invention also resists tearing by sharp objects, and even if one part of the single layer film corresponding to one side of the bubble starts tearing because of a defect, the other part corresponding to the other side of the bubble is resistant to such tearing. Also, if there is any irregularity in one side of the bubble, the other side of the bubble in the resultant single layer film will take the stress, resulting in less breakage of the film. Further, a stretch film in accordance with the invention exhibits higher elasticity because of its orientation compared to a stretch film produced by a cast process.

The thickness of the tubular film before collapse may be in the range of from about 5 to about 15 microns so as to provide the single layer bonded film with a thickness in the range of from about 10 to about 30 microns.

The plastic material may be polyolefin material, which may also contain polyisobutylene to improve its cling properties. The plastic material may be selected from the group consisting of LLDPE, mLLDPE, mPE, copolymers thereof and blends thereof.

The stretch plastic film may be formed by extruding suitable plastic material from an annular die as a tubular film, forming the extruded film into a bubble with air entrapped therein by simultaneously collapsing and bonding the tubular film at a predetermined distance from the annular die, and causing the temperature of the tubular film when collapsed to be sufficiently high to cause opposite sides of the collapsed film to become bonded together to form a single layer of film.

The p resent invention also provides a method of producing stretched plastic film including extruding suitable plastic material from an annular die as a tubular film, forming the extruded film into a bubble with air entrapped therein by collapsing the tubular film bubble at a predetermined distance from the annular die, and causing the temperature of the tubular film when collapsed to be sufficiently high to cause opposite sides of the collapsed film to become bonded together and form a single layer of stretched plastic film.

The predetermined distance between the annular die and the collapse of the tubular film in the range of from about 10 to about 35 feet, and the blow-up ratio may be in the range of from about 1.2:1 to about 5:1. The tubular film bubble may be cooled by ambient or cooled external air and/or by air within the bubble.

DESCRIPTION OF THE DRAWING

Embodiments of the invention will now be described, by way of example, with reference to the accompanying drawings, of which.

DESCRIPTION OF PREFERRED EMBODIMENTS

The stretch film may comprise polyethylene and 4 wt % polyisobutylene or LLDPE without any additives. The polyolefin material contains no slip or antiblock additives. Polyisobutylene (PIB) may be used as a cling additive. Polyisobutylene is an elastomer polymer based on aliphatic olefins. Depending on its molecular weight, PIB is partially incompatible with polyethylene for high molecular weight fractions and compatible for low molecular weight components. PIB may be added by a gear pump into the feed throat of the extruder or may be added in a pre-compounded polyethylene concentrate or by directly injecting it into the extruder. A disadvantage of a precompounded master batch is that it sticks to the feedthroat, resulting in inconsistent feed and hence surging during processing.

The bubble may be collapsed at a tower height of 10 to 35 feet in order to block the film, i.e. cause opposite sides of the collapsed film to become bonded together. Blow up ratios from 1.2:1 to 5:1 may be used. A blow up ratio of 2.5:1 is preferable for down gauging the film to 5 microns and hence giving a finished blocked film with a thickness of 10 microns.

Figure 1:
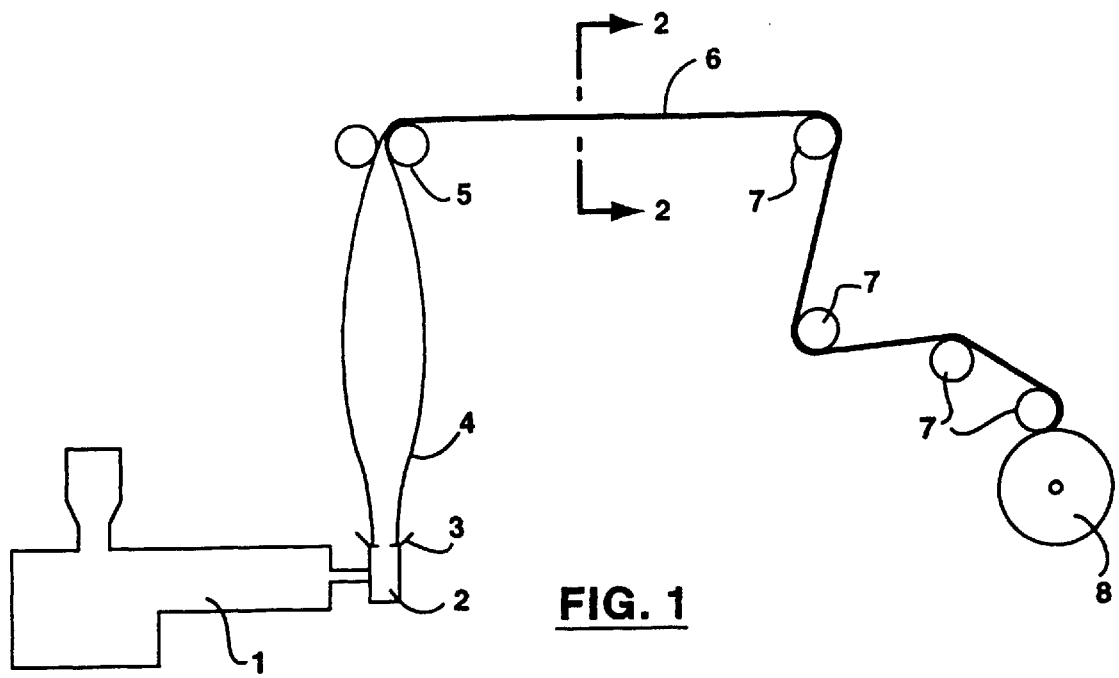
FIG. 1 is a diagrammatic view of a method of producing a single layer stretch plastic film in accordance with the invention by means of a blown film process.
Figure 2:
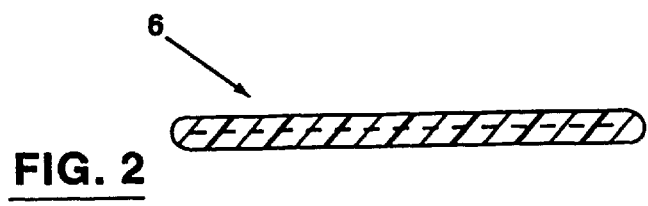
FIG. 2 is a cross-sectional view taken along the line 2—2 of FIG. 1 of single layer stretch plastic film in accordance with the invention.

Referring first to FIGS. 1 and 2 of the drawings, a tubular single layer stretch plastic film 4 is extruded by an extruder 1 through an annular die 2 and is cooled by an air ring 3. Air is enclosed in the bubble between the die 2 and pinch rolls 5. The pinch rolls 5 collapse the tubular film bubble, and the temperature of the film bubble when collapsed is sufficiently high to cause opposite sides of the film bubble to become bonded together, i.e. blocked, to form a single layer stretch plastic film 6. A collapsing frame (not shown) may be provided below pinch rolls 5 in known manner. The amount of air in the bubble 4 is varied to obtain different blow up ratios, and the speed of the pinch rolls 5 is varied to obtain different stretch ratios. The resultant single layer stretch plastic film 6 is passed over idler rolls 7 and wound onto a surface winder 8.

Figure 3:
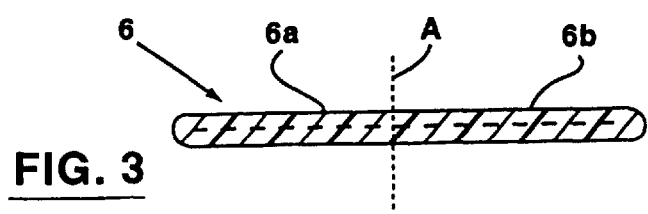
FIG. 3 is a similar view showing how the single layer stretch plastic film of FIG. 2 can be cut along its central longitudinal axis to produce two stretched plastic films each having half the width of the original film.

The single layer stretch plastic film 6 is of full width, as shown in FIG. 2. As shown in FIG. 3, the film 6 may be cut along its central longitudinal axis A to form two single layer strips plastic film 6a, 6b each having half the width of the original film 6.

Figure 4:
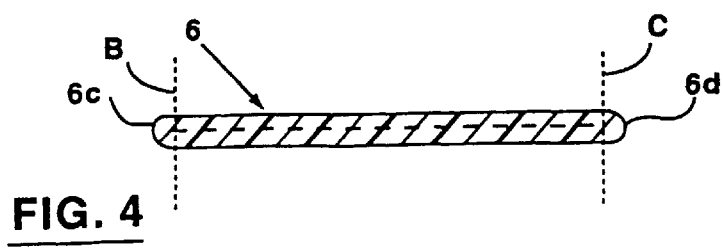
FIG. 4 is a similar view showing how the opposite side edge portions of the single layer stretch plastic film of FIG. 2 can be removed.

As shown in FIG. 4, opposite side edge portions 6c, 6d of the film 6 may be removed by cutting along lines B and C. If desired, the film 6 may be cut longitudinally into two or more strips.

Specific examples of the invention will now be described.

EXAMPLE 1

A copolymer, mPE, made by EXXON Chemical Co., under the trade name Exceed 3028, with a melting point of 92° C., a vicat softening point of 80° C., density of 0.9 g/cc. melt index of 1.2 and a melt temperature of 210° C. was used in this example. This material is characterized by a narrow molecular weight distribution and composition distribution.

Polyisobutylene (PIB), made by Amoco chemical Co., under the trade name H-100, with an average molecular weight of 920, density 0.883 g/cc, viscosity CS at 99° C. of 196–233 and specific gravity at 15.6° C. of 0.8899, was added. The PIB (4 wt %) was added via a gear pump through the feed throat of the extruder 1.

The film extruded from extruder 2 was rapidly cooled by ambient air at 25° C. by the air ring 3 and air was injected into the bubble to biaxially stretch the film 4 four times lengthwise and three times breadthwise simultaneously between the die 2 and the pinch rolls 5. The bubble was collapsed and blocked while warm (60° C.) at a nip height of 10 feet by the pinch rolls 5. After passing the block film 6 over idler rollers 7, it was wound on surface winder 8. The finished biaxially oriented stretch film 6 had a width of 12 inches and a thickness of 15 microns.

EXAMPLE 2

Stretch film was produced in the same manner as in Example 1 except that the polyolefin was LLDPE. The polymer was produced by Dow Chemical Co. under the trade name DOWLEX 2267A with a vicat softening point of 98° C., density 0.91 d/cc, a melt index of 0.85 and no slip or antiblock additives. The biaxially oriented stretch film which was produced had a width of 18 inches and thickness of 20 microns.

Other embodiments and examples of the invention will be readily apparent from the foregoing description, the scope of the invention being defined in the appended claims.

We claim:

1. A method of producing stretch plastic film including:
   extruding suitable plastic material from an annular die as a tubular film,
   forming the extruded film into a bubble with air entrapped therein by simultaneously collapsing and bonding the tubular film bubble at a predetermined distance from the annular die,
   wherein the temperature of the tubular film when collapsed is sufficiently high to cause opposite sides of the collapsed film to become bonded together and form a single layer stretch plastic film.

2. A method according to claim 1 wherein the predetermined distance between the annular die and the collapse of the tubular film is in the range of from about 10 to about 35 feet.

3. A method according to claim 1 wherein the blow-up ratio is in the range of from about 1.2:1 to about 5:1.

4. A method according to claim 1 wherein the tubular film bubble is cooled by ambient or cooled external air.

5. A method according to claim 1 wherein the tubular film bubble is cooled by air within the bubble.

6. A method according to claim 1 wherein the thickness of the tubular film before collapse is in the range of from about 5 to about 15 microns, so as to provide the single layer bonded film with a thickness in the range of from about 10 to about 30 microns.

7. A method according to claim 1 wherein the plastic material is polyolefin material.

8. A method according to claim 7 wherein the polyolefin material also contains polyisobutylene to improve its cling properties.

9. A method according to claim 1 wherein the plastic material is selected from the group consisting of LLDPE, mLLDPE, mPE and blends thereof.

10. A method according to claim 9 wherein the plastic material contains polyisobutylene to improve its cling properties.

11. A method according to claim 1 wherein the single layer stretched plastic film is cut longitudinally into two or more strips.

12. A method according to claim 1 wherein opposite side edge portions of the single layer stretched plastic film are removed.

* * * * *